US012693930B1

(12) United States Patent

Mukherjee

(10) Patent No.: US 12,693,930 B1
(45) Date of Patent: Jul. 28, 2026

(54) SYSTEM AND METHOD FOR GENERATING PREDICTIONS OF PROTRACTED OUTAGES OF SOFTWARE APPLICATIONS AND COMPUTING SYSTEMS

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/039,367

(22) Filed: Jan. 28, 2025

(51) Int. Cl.
G06F 11/00 (2006.01)
G06F 11/07 (2006.01)
G06F 11/34 (2006.01)

(52) U.S. Cl.
CPC ........ G06F 11/0793 (2013.01); G06F 11/008 (2013.01); G06F 11/0766 (2013.01); G06F 11/3409 (2013.01)

(58) Field of Classification Search
CPC . G06F 11/0793; G06F 11/008; G06F 11/0766
See application file for complete search history.

(56) References Cited

U.S. PATENT DOCUMENTS 6,901,347 B1 * 5/2005 Murray ................. G06F 11/008
714/4.11
6,978,398 B2 * 12/2005 Harper ............... G06F 11/2028
714/13

| | | | | |
|---|---|---|---|---|
| 6,986,076 | B1 * | 1/2006 | Smith | ................. H04L 41/0631 |
| | | | | 714/4.11 |
| 7,213,179 | B2 * | 5/2007 | Song | ..................... G06F 11/008 |
| | | | | 709/224 |
| 8,595,565 | B1 * | 11/2013 | Olney | ................. G06F 11/3419 |
| | | | | 714/48 |
| 9,830,212 | B2 * | 11/2017 | Aggarwal | ........... G06F 11/0769 |
| 9,847,926 | B2 * | 12/2017 | Couture | .................. H04L 43/10 |
| 10,725,842 | B1 * | 7/2020 | Bernico | .................. G06F 11/34 |
| 11,045,271 | B1 | 6/2021 | Tran | |
| 11,113,139 | B2 * | 9/2021 | Fernandez | ........... G06F 11/079 |
| 11,210,836 | B2 | 12/2021 | Amer et al. | |
| 11,278,413 | B1 | 3/2022 | Lang | |

(Continued)

*Primary Examiner* — Jonathan D Gibson

(57) ABSTRACT

A system includes a memory configured to store software application performance data associated with an operational performance of a software application and a processor operably coupled to the memory and configured to access the software application performance data and preprocess the software application performance data. Preprocessing the software application performance data includes normalizing disparate key performance indicator (KPI) data indicative of the operational performance. The processor is further configured to train an artificial intelligence algorithm and execute, based on the preprocessed software application performance data, and, in response to the training of the artificial-intelligence algorithm, the artificial-intelligence model to generate a prediction of an impending outage for the software application. The processor is further configured to cause a computing device to display a visual representation of the outputted prediction of the impending outage for the software application and to cause a remediation of the software application to be executed.

20 Claims, 3 Drawing Sheets

(56)         References Cited

U.S. PATENT DOCUMENTS

| | | | | |
|---|---|---|---|---|
| 11,558,272 | B2 | 1/2023 | Ranjan et al. | |
| 11,687,778 | B2 | 6/2023 | Ciftci et al. | |
| 11,863,844 | B2 | 1/2024 | Iyer et al. | |
| 11,921,612 | B2* | 3/2024 | Morariu | G06F 11/3006 |
| 12,047,400 | B2 | 7/2024 | Thompson | |
| 2007/0276631 | A1* | 11/2007 | Subramanian | G06F 11/008 |
| | | | | 702/182 |
| 2008/0126857 | A1* | 5/2008 | Basham | G06F 11/3466 |
| | | | | 714/25 |
| 2009/0031174 | A1* | 1/2009 | Moon | G06F 11/0709 |
| | | | | 714/E11.19 |
| 2011/0202795 | A1* | 8/2011 | Marathe | G06F 11/1438 |
| | | | | 714/E11.113 |
| 2013/0086194 | A1* | 4/2013 | Estes | G06F 11/3006 |
| | | | | 709/207 |
| 2016/0062816 | A1* | 3/2016 | Ivanova | H04L 41/507 |
| | | | | 714/57 |
| 2016/0274990 | A1* | 9/2016 | Addleman | G06F 11/3409 |
| 2019/0108448 | A1 | 4/2019 | O'Malia et al. | |
| 2019/0129405 | A1 | 5/2019 | Cella et al. | |
| 2019/0258953 | A1 | 8/2019 | Lang et al. | |
| 2022/0122001 | A1 | 4/2022 | Choe et al. | |
| 2022/0179639 | A1* | 6/2022 | Manley | G06F 11/3688 |
| 2023/0095092 | A1 | 3/2023 | Xiao et al. | |
| 2023/0135553 | A1 | 5/2023 | Cella et al. | |
| 2023/0245651 | A1 | 8/2023 | Wang | |
| 2023/0252224 | A1 | 8/2023 | Tran | |
| 2023/0351102 | A1 | 11/2023 | Tran | |
| 2024/0106268 | A1 | 3/2024 | Cella et al. | |
| 2024/0127152 | A1* | 4/2024 | Kearns | G06Q 10/0635 |
| 2024/0242286 | A1 | 7/2024 | Blair et al. | |
| 2024/0362649 | A1* | 10/2024 | Baembitov | G06Q 10/04 |
| 2025/0148318 | A1* | 5/2025 | Penumarthi | G06N 20/00 |
| 2025/0240227 | A1* | 7/2025 | Oglesby | H04L 41/16 |
| 2025/0355756 | A1* | 11/2025 | Dahiya | G06F 11/0793 |
| 2025/0383901 | A1* | 12/2025 | White | G06F 9/45558 |

* cited by examiner

SYSTEM AND METHOD FOR GENERATING PREDICTIONS OF PROTRACTED OUTAGES OF SOFTWARE APPLICATIONS AND COMPUTING SYSTEMS

TECHNICAL FELD

The present disclosure relates generally to computing security, and, more specifically, to a system and method for generating predictions of protracted outages of software applications and computing systems.

BACKGROUND

Certain web-based environments may include data being exchanged and stored across any number of computing systems and databases. For example, the data may include various user data or service data that may be stored to databases associated with respective entities, and that user data or service data may be exchanged between various centralized or decentralized servers and various computing systems for servicing end users. However, such web-based environments may be sometimes subjected to various threats and cyberattacks.

SUMMARY

The system and methods implemented by the system as disclosed in the present disclosure provide technical solutions to the technical problems discussed above by generating predictions of protracted outages of software applications and computing systems. The disclosed system and methods provide several practical applications and technical advantages. Specifically, the present embodiments improve the security, reliability, and maintainability of computing resources, such as software applications, software systems, software services, processors (e.g., central processing units (CPUs), graphic processing units (GPUs), artificial-intelligence (AI) accelerators), storage (e.g., databases), network devices (e.g., hubs, routers, gateways, network interface cards (NICs), modems, repeaters, wireless access points (WAPs), and so forth), and memory (e.g., read-only memory (ROM), random-access memory (RAM), ternary content-addressable memory (TCAM), dynamic random-access memory (DRAM), static random-access memory (SRAM), and so forth), or other similar computing resources that may be vulnerable to software application faults, software service outages, data breaches, or other systemic vulnerabilities that may lead to a large-scale and protracted outage.

In particular embodiments, the present embodiments include a processor accessing software application performance data associated with an operational performance of a software application and then utilizing one or more artificial-intelligence models trained to generate predictions of protracted outages of the software application. In particular embodiments, the one or more artificial-intelligence models may include one or more foundation models (FMs) (e.g., self-supervised deep neural networks (DNNs), deep convolutional neural networks (DCNNs)) that may be pretrained based on a large training data set of publicly-available software application performance data associated with at least a first protracted outage of a software application and a training data set of proprietary software application performance data associated with at least a second protracted outage of a software application. Specifically, in accordance with the presently-disclosed embodiments, the FM may be pretrained in accordance with a self-supervised learning (SSL) process on unlabeled software application performance data from a number of large-scale and protracted software application outages (e.g., software application outage events affecting more than 500,000 users, more than 1 million users, more than 10 million users, more than 50 million user, more than 100 million users and persisting for more than 30 minutes, more than 1 hour, more than 2 hours, more than 6 hours, more than 12 hours, or more than 24 hours), and thus enabling the FM to infer KPI data patterns, recognize relationships between KPI data, discern context of KPI data, and generalize knowledge for accurately predicting such large-scale and protracted outages before the occurrence thereof.

In particular embodiments, the software application performance data may be preprocessed to normalize disparate key performance indicator (KPI) data indicative of the operational performance of the software application. For example, in accordance with the presently-disclosed embodiments, the FM may include a multimodal foundation model (MMFM) that may be suitable for processing and executing upon multiple data modalities of KPI data (e.g., different types of KPI data, such as service uptime KPI data, downtime duration KPI data, average response time KPI data, latency KPI data, throughput KPI data, mean time to recover (MTTR) KPI data, response and resolution time KPI data, and so forth) that may be indicative of an impending outage (e.g., protracted outage) of the software application. Thus, in accordance with the presently disclosed embodiments, prior to providing the software application performance data to the FM, a data preprocessing of the disparate KPI data may be performed in which the multiple data modalities of KPI data may be normalized (e.g., scaled) and formatted to be consistent throughout for better and more accurate training of the FM.

The one or more artificial-intelligence models (e.g., FM) may be executed, based on the preprocessed software application performance data, and, in response to the training of the one or more artificial-intelligence models, to generate a prediction of an impending outage (e.g., protracted outage) of the software application. For example, in particular embodiments, the one or more artificial-intelligence models (e.g., FMs) may be executed to output a prediction of one or more KPI values (e.g., a service uptime value, a downtime duration value, a mean time between failures (MTBF) value, an average response time value, a latency value, a throughput value, a response and resolution time value, and so forth) indicative of the impending outage for the software application.

In another embodiment, based on the preprocessed software application performance data, and, in response to the training of the one or more artificial-intelligence models, the one or more artificial-intelligence models (e.g., FM) may be fine-tuned to generate a prediction of an impending outage (e.g., protracted outage) of the software application based on only a data set of hardware computing KPI data, based on only a data set of software computing KPI data, or based on only a data set of hybrid computing KPI data.

Specifically, in accordance with the presently disclosed embodiments, subsequent to the pretraining of the one or more artificial-intelligence models (e.g., FM), the one or more artificial-intelligence models (e.g., FM) may be adapted by fine-tuning the one or more artificial-intelligence models (e.g., FM) on a smaller, domain-specific or task-specific data set (e.g., a data set of hardware computing KPI data, a data set of software computing KPI data, a data set of hybrid computing KPI data) including labeled examples, such that the one or more artificial-intelligence models (e.g., FM) may generate accurate predictions of an impending outage (e.g., protracted outage) of a software application even when an input data set of software application performance data includes a single modality of KPI data (e.g., average response time) or is otherwise heavily biased toward a particular modality of KPI data (e.g., average response time as opposed to utilization rate or service uptime).

In particular embodiments, upon the one or more artificial-intelligence models (e.g., FM) generating a prediction of an impending outage (e.g., protracted outage) of the software application, the processor may further cause a computing device to display a visual representation of the outputted prediction of the impending outage for the software application. For example, in one embodiment, the processor may cause the computing device to display a software application monitoring dashboard, which may include the visual representation of the outputted prediction of the impending outage for the software application to be viewed and interacted with by a user. In particular embodiments, in response to the user providing one or more user inputs to the software application monitoring dashboard executing on the computing device, the processor may then cause to be executed a remediation plan prior to the potential occurrence of a protracted outage of the software application. The systems and methods of the present disclosure relate to predicting protracted outages of software applications and remediating potential root causes of those predicted outages, and therefore is rooted in computer systems technologies.

In particular, upon predicting potential protracted outages, the systems and methods described herein may take one or more actions to prevent or reduce the impact of any potential outage. In the short term, this could include restarting services that are identified as the potential root cause of a potential future outage; applying software patches or updates that address known or predicted vulnerabilities or bugs; reallocating resources (e.g., CPU, memory, or storage) to address potential resource constraints that may be a potential root cause of a potential future outage; changing configurations, such as network settings, database configurations, or application parameters, which might be the cause of a potential future outage; or the like. In the longer term, this could include applying code changes to improve performance, fix bugs, or enhance stability; upgrading infrastructure, such as underlying hardware or software components that are outdated or insufficient for current demands (e.g., adding more servers, upgrading network equipment, or moving to a more robust cloud infrastructure); or improving underlying processes, such as development methodologies, testing procedures, or deployment processes. Additionally, redundancy can be implemented in the system architecture to ensure that if one component fails, others can take over without causing an outage. For example, a failover system can be implemented, such as with database replication, server clustering, or redundant network paths. Furthermore, load balancing can be used to distribute traffic across servers, preventing any single server from becoming a point of failure or a bottleneck.

The systems and methods of the present disclosure achieve several technical improvements for underlying computer systems and related technologies. In particular, it leads to enhanced system stability and reliability. By addressing immediate and long-term issues, the underlying computer systems experience fewer outages, leading to higher uptime and reliability. Identifying and fixing potential problems before they cause outages provides a more stable operating environment. It also leads to improved performance in the form of more efficient use of resources. Applying software patches and updates helps protect the system from predicted vulnerabilities and threats that may lead to outages. Implementing redundancy and failover mechanisms allows the underlying computer system to operate smoothly even if individual components fail. Additionally, the predictive nature of the present disclosure allows for timely intervention so that outages and prolonged downtimes can be avoided, or at least reduced.

Thus, by predicting potentially protracted outages of software applications, services, and systems before the protracted outages are allowed to occur may mitigate the potential for software application faults, software service outages, data breaches, or other systemic vulnerabilities that may occur in software applications, systems, and services over the lifespan of the software applications, services, and systems, and thereby preempt the occurrences of protracted outages and permanent disruptions to services. Additionally, by generating predictions of a potentially protracted outage before a protracted outage occur or and persist, the present embodiments may further extend the lifespan, serviceability, and maintainability of software applications, services, and systems.

Furthermore, by pretraining and fine-tuning a foundation model (FM) to predict potentially protracted outages of software applications, services, and systems before the protracted outages are allowed to occur, the present embodiments may further reduce the processing workloads of the one or more processors and the storage capacity of the memory. In particular, the present embodiments may reduce the processing workloads of the one or more processors and the storage capacity of the memory because while the first pretraining of the FM may be compute-intensive and computationally expensive (e.g., requiring the compute power of dozens or hundreds of artificial-intelligence (AI) accelerators and terabytes (TBs) of memory capacity), the fine-tuning of the FM to predict potentially protracted outages of software applications, services, and systems based on only a data set of hardware computing KPI data, based on only a data set of software computing KPI data, based on only a data set of hybrid computing KPI data may be accomplished utilizing only a single AI accelerator (e.g., processor) and only a few gigabytes (GBs) of memory capacity. In this way, the present embodiments may further reduce the processing workloads of the one or more processors and the storage capacity of the memory in accordance with the techniques described herein.

The present embodiments are directed to systems and methods for generating predictions of protracted outages of software applications and computing systems. In particular embodiments, a system includes a memory configured to store a software application and software application performance data. In one embodiment, the software application performance data is associated with an operational performance of the software application. For example, in one embodiment, the software application performance data may include software application performance metrics or software application telemetry data. In particular embodiments, the system further includes a processors operably coupled to the memory may be configured to access the software application performance data and preprocess the software application performance data.

In particular embodiments, preprocessing the software application performance data may include normalizing disparate key performance indicator (KPI) data indicative of the operational performance of the software application. For example, in one embodiment, the disparate key KPI data comprises one or more of a data set of hardware computing KPI data, a data set of software computing KPI data, or a data set of hybrid computing KPI data. In particular embodiments, the processor may be further configured to train an artificial-intelligence model based at least in part on a training data set of publicly-available software application performance data associated with at least a first protracted outage of a software application and a training data set of proprietary software application performance data associated with at least a second protracted outage of a software application.

For example, in one embodiment, the artificial-intelligence model may include one or more of a language model (LM), a large language model (LLM), a bidirectional and auto-regressive transformer (BART) model, a bidirectional encoder representations for transformer (BERT) model, a generative pretrained transformer (GPT) model, or a diffusion model. In particular embodiments, the processor may be further configured to execute, based at least in part on the preprocessed software application performance data, and, in response to the training of the artificial-intelligence model, the artificial-intelligence model to generate a prediction of an impending outage for the software application. For example, in one embodiment, the prediction of the impending outage may include a prediction of a potentially protracted outage of the software application.

In particular embodiments, the processor may be further configured to output the prediction of the impending outage for the software application by outputting, by the artificial-intelligence model, a prediction of one or more KPI values indicative of the impending outage for the software application. For example, in particular embodiments, the artificial-intelligence model may include a foundation model (FM) trained and fine-tuned to generate the prediction of the impending outage for the software application based at least in part on only a data set of hardware computing KPI data, only a data set of software computing KPI data, only a data set of hybrid computing KPI data, or only a data set of real-time computing KPI data.

In particular embodiments, the processor may be further configured to output, by the artificial-intelligence model, the prediction of the impending outage for the software application and to cause a computing device to display a visual representation of the outputted prediction of the impending outage for the software application. In particular embodiments, the processor may be further configured to cause the computing device to display a software application monitoring dashboard including the visual representation of the outputted prediction of the impending outage for the software application. In particular embodiments, the one or more KPI values may include one or more of a service uptime value, a downtime duration value, a mean time between failures (MTBF) value, an average response time value, a latency value, a throughput value, an error rate value, an incident event count value, a mean time to recover (MTTR) value, a utilization rate value, a scalability value, or a response and resolution time value.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

6

Figure 1:
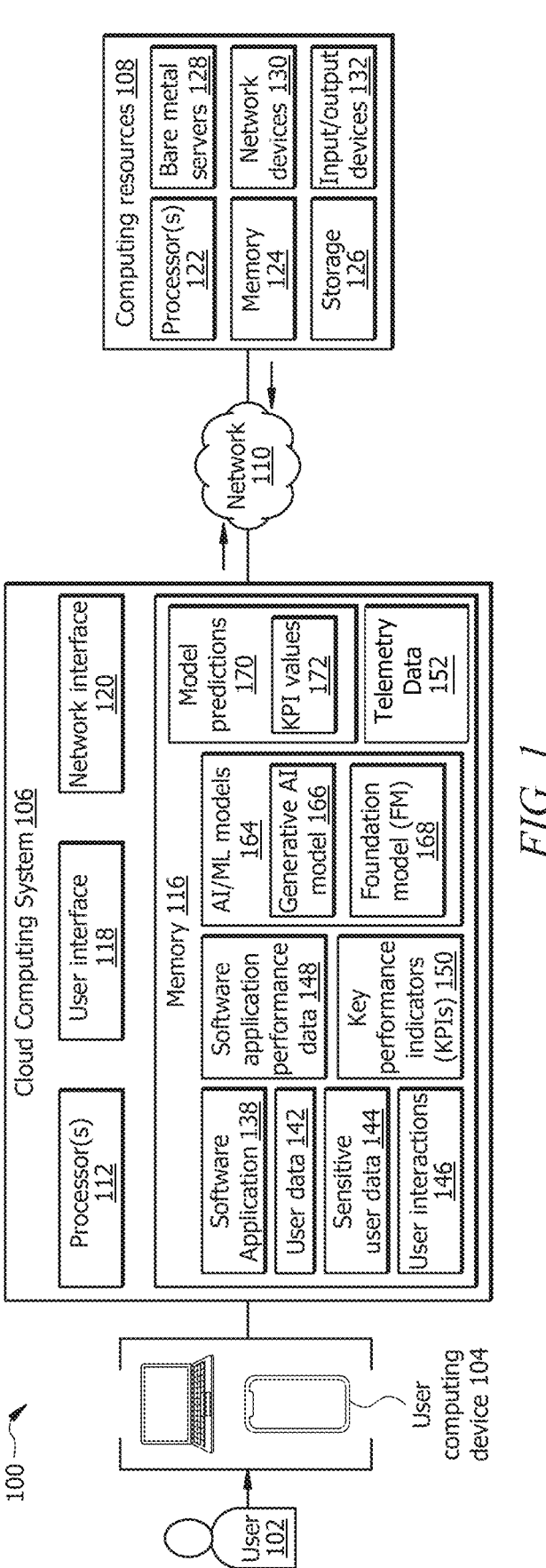
Figure 2:
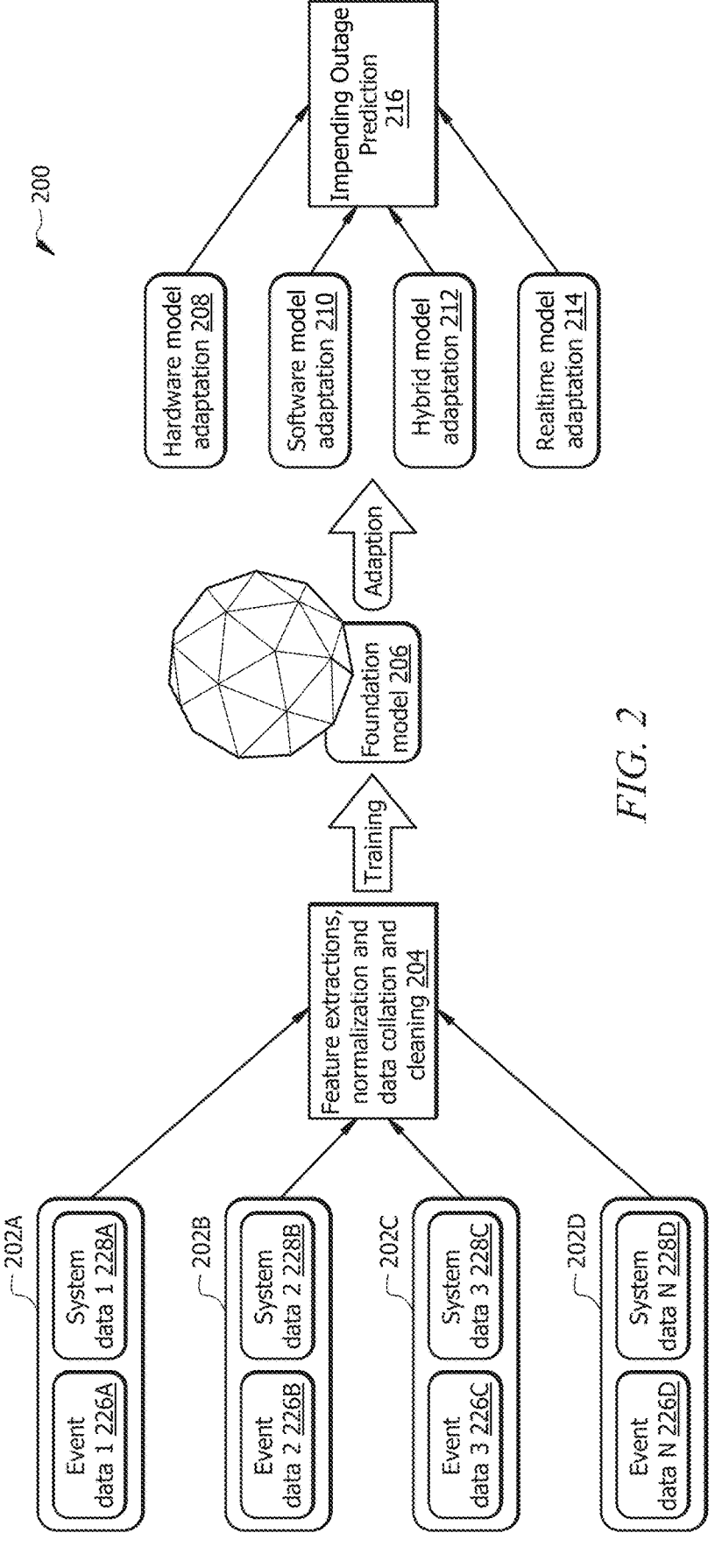
Figure 3:
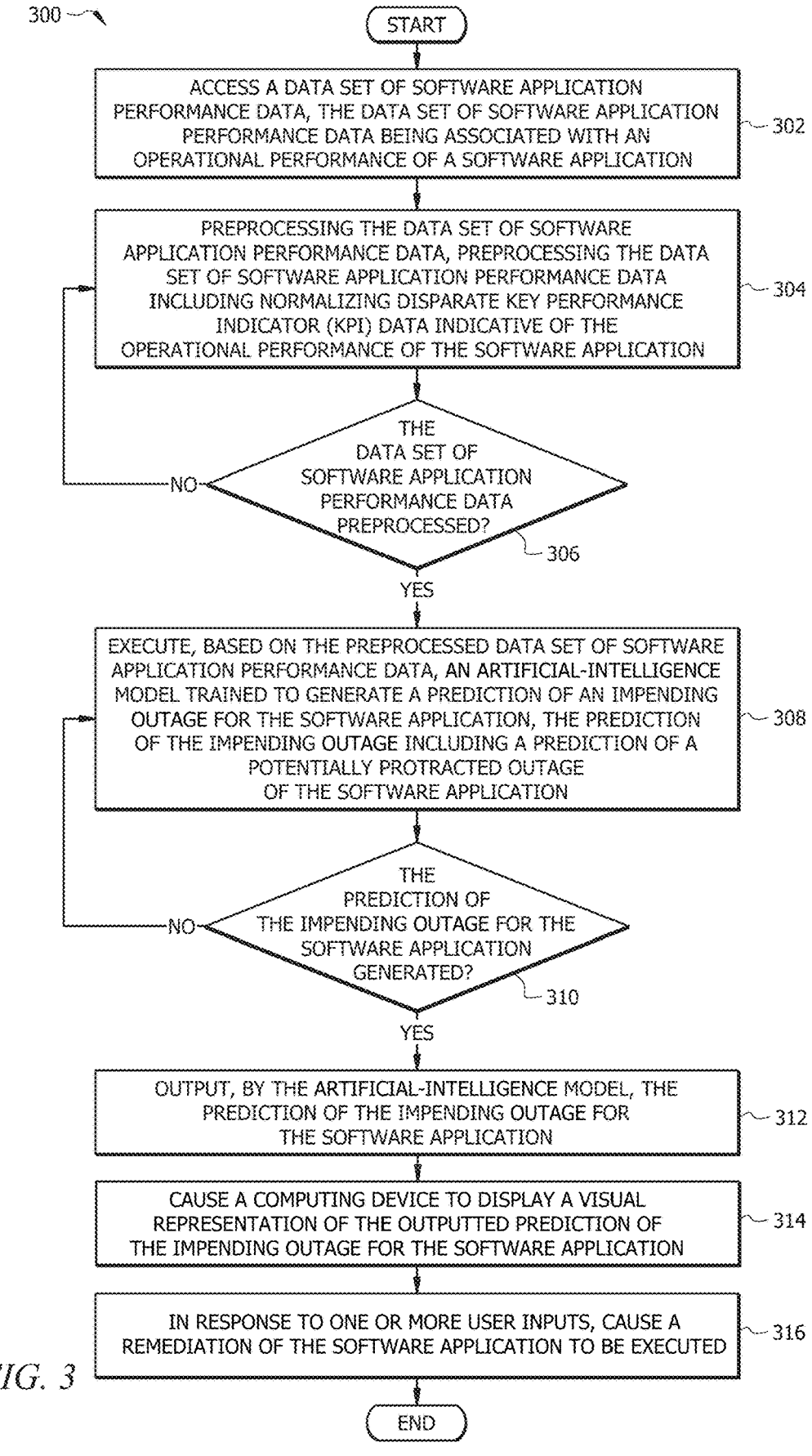

FIG. 1 is a block diagram of a cloud computing and computing resources system, in accordance with certain aspects of the present disclosure;

FIG. 2 illustrates a diagram of an outage detection and prediction architecture for generating predictions of protracted outages of software applications and computing systems, in accordance with one or more embodiments of the present disclosure; and FIG. 3 illustrates a flowchart of an example method for generating predictions of protracted outages of software applications and computing systems, in accordance with one or more embodiments of the present disclosure.

DETAILED DESCRIPTION

Example System

FIG. 1 is a block diagram of a cloud computing and hardware computing resources system 100. In particular embodiments, the system 100 may include a user computing device 104 associated with a user 102, a cloud computing system 106, computing resources 108, and a network 110. In particular embodiments, the user 102 may include a user associated with an institution, an organization, or an entity that receives user data (e.g., user data 142) and hosts and maintains sensitive user data (e.g., sensitive user data 144) that may be associated with the user 102. The network 110 enables communications and exchanges of data among components of the system 100, such as the user computing device 104, the cloud computing system 106, and the computing resources 108.

In general, the system 100 may be utilized to generate predictions (e.g., model predictions 170) of protracted outages of software applications (e.g., software application 138) and computing systems (e.g., cloud computing system 106). As used herein, an "outage" or a "protracted outage" may refer to a protracted and widespread disruption or interruption of the operations of a software application, software system, or software service, such that a large number of users of the software application, software system, or software service may be inhibited from accessing and utilizing the services and data of the software application, software system, or software service for an extended period of time (e.g., more than 30 minutes, more than 1 hour, more than 2 hours, more than 6 hours, more than 12 hours, or more than 24 hours).

In particular embodiments, the cloud computing system 106 may include one or more processor(s) 112 in signal communication with a memory 116. The memory 116 stores software instructions 140 that when executed by the processor(s) 112, cause the processor(s) 112 to perform one or more functions described herein. For example, when the software instructions 140 are executed, the processor(s) 112 generates predictions (e.g., model predictions 170) of protracted outages of software applications (e.g., software application 138) and computing systems (e.g., cloud computing system 106) in accordance with the presently disclosed embodiments.

The cloud computing system 100 may be configured as shown, or in any other configuration. In one embodiment, the cloud computing system 106 may include a private cloud computing and storage system, which may include, for example, a cloud computing environment and infrastructure that may be managed, controlled, and dedicated to a single organization or entity. In another embodiment, the cloud computing system 106 may include a hybrid cloud computing and storage system, which may include, for example, a mixed computing environment and infrastructure in which software applications are executing utilizing some combination of computing, storage, and services in both private cloud environments and public cloud environments. Still, in another embodiment, the cloud computing system 106 may include a public cloud computing and storage system, which may include, for example, a cloud computing environment and infrastructure that may be serviced to any number of organizations or entities as virtual resources accessible over the internet.

System Components

Network

The network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Cloud Computing System

In particular embodiments, the cloud computing system 106 may include any computing system that may be utilized to process data and communicate with computing devices (e.g., user computing device 104), databases, or computing systems (e.g., computing resources 108) via the network 110. The cloud computing system 106 may be utilized to oversee operations of the processor(s) 112. In particular embodiments, the cloud computing system 106 may include the processor(s) 112 in signal communication with a network interface 120, a user interface 118, and memory 116. The cloud computing system 106 may be configured as shown, or in any other configuration.

The processor(s) 112 may include one or more processors operably coupled to the memory 116. The processor(s) 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor(s) 112 may be a programmable logic device, a microcontroller, a microprocessor, or any suitable combination of the preceding. The processor(s) 112 may be communicatively coupled to and in signal communication with the network interface 120, user interface 118, and memory 116. The one or more processors may be utilized to process data and may be implemented in hardware, software, or some combination thereof.

For example, the processor(s) 112 may be 8-bit, 16-bit, 32-bit, 64-bit or of any other suitable architecture. The processor(s) 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors 112 are configured to implement various instructions. For example, the one or more processors may be utilized to execute software instructions 140 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

The network interface 120 may be utilized to enable wired and/or wireless communications (e.g., via the network 110).

The network interface 120 may be utilized to communicate data between the cloud computing system 106 and other network devices, systems, or domain(s). For example, the network interface 120 may comprise a WIFI interface, a local area network (LAN) interface, a wide area network (WAN) interface, a modem, a switch, or a router. The processor(s) 112 may be configured to send and receive data using the network interface 120. The network interface 120 may be configured to use any suitable type of communication protocol.

The memory 116 may be volatile or non-volatile and may include a read-only memory (ROM), random-access memory (RAM), ternary content-addressable memory (TCAM), dynamic random-access memory (DRAM), and static random-access memory (SRAM), or other non-transitory computer-readable medium. The memory 116 may be implemented using one or more disks, tape drives, solid-state drives, and/or the like. As will be discussed in greater detail below with respect to FIG. 2, the memory 116 may be operable to store the software instructions 140, user data 142, sensitive user data 144, user interactions 146, software application performance data 148, key performance indicators (KPIs) 150, decoy data 152, one or more artificial-intelligence (AI)/machine-learning models 164 (e.g., including one or more generative machine-learning models 166 and/or one or more foundation models (FMs) 168), model predictions 170, KPI values 172, and/or any other data, instructions, or functional blocks that may be suitable for supporting the generation of predictions (e.g., model predictions 170) of protracted outages of software applications (e.g., software application 138).

The memory 116 may also store instances of software application 138 that may be executing within the system 100. In one embodiment, the instances of a software application 138 may include any number of instances a large software application suitable for hosting and servicing thousands or millions of individual users 102 that may interact via user computing devices 104 with the cloud computing system 106. The users 102 may be further associated with the sensitive user data 144.

Processor(s)

In particular embodiments, the processor(s) 112 may generate predictions (e.g., model predictions 170) of protracted outages of software applications (e.g., software application 138) and computing systems (e.g., cloud computing system 106) in accordance with the presently disclosed embodiments. In particular embodiments, the processor(s) 112 monitor and ping each of processors 122 (e.g., CPUs, GPUs, AI accelerators), memory 124, storage 126 (e.g., databases), bare metal servers 128, network devices 130, and input/output (I/O) devices 132 for software application performance data 148 (e.g., performance metrics, telemetry data 152, and so forth) and key performance indicator (KPI) metrics (e.g., a service uptime metric, a downtime duration metric, a mean time between failures (MTBF) metric, an average response time metric, a latency metric, a throughput value, an error rate metric, an incident event count metric, a mean time to recover (MTTR) metric, a utilization rate metric, a scalability metric, a response and resolution time metric, and so forth).

In particular embodiments, upon obtaining the software application performance data 148, the processor(s) 112 may then train and execute the AI/ML models 164 (e.g., including one or more generative machine-learning models 166 and/or one or more foundation models (FMs) 168) trained to generate a model prediction 170 of a potentially protracted outage of the software application 138. In one embodiment, the AI/ML models 164 may include one or more of a language model (LM), a large language model (LLM), a bidirectional and auto-regressive transformer (BART) model, a bidirectional encoder representations for transformer (BERT) model, a generative pretrained transformer (GPT) model, a diffusion model, or a foundation model (FM) (e.g., deep neural networks (DNNs), deep convolutional neural networks (DCNNs)).

Computing Resources

In particular embodiments, the computing resources 108 may include any computing resources across the system 100 that may be utilized to support the execution of the software application 138 and provide indications of the software application performance data 148 and the key performance indicators (KPIs) 150. For example, in one embodiment, the computing resources 108 may include one or more hardware, software, or hybrid computing resources that may be external to the cloud computing system 106. In another embodiment, the computing resources 108 may include one or more hardware, software, or hybrid computing resources internal to the cloud computing system 106, such as hardware computing resources at the hardware layer of the cloud computing system 106.

As further depicted, the computing resources 108 may include one or more processors 122 (e.g., CPUs, GPUs, AI accelerators), memory 124 (e.g., ROM, RAM, TCAM, DRAM, SRAM, and so forth), storage 126 (e.g., one or more databases), bare metal servers 128 (e.g., one or more physical servers), network devices 130 (e.g., hubs, routers, gateways, NICs, modems, repeaters, WAPs, and so forth), or other similar computing resources 108 that may be vulnerable to software application faults, software service outages, data breaches, or other systemic vulnerabilities that may lead to a large-scale and protracted outage.

Generating Predictions of Protracted Outages of Software Applications and Computing Systems Embodiments of the present disclosure discuss techniques for generating predictions of protracted outages of software applications and computing systems.

FIG. 2 illustrates a diagram of an outage detection and prediction architecture 200 for generating predictions of protracted outages of software applications and computing systems, in accordance with certain aspects of the present disclosure. In particular embodiments, the outage detection and prediction architecture 200 may correspond to the cloud computing system 106 and may be executed by the processor(s) 112 as described above with respect to FIG. 1. As depicted, the outage detection and prediction architecture 200 may include a number of software application performance data sets 202A, 202B, 202C, and 202D. For example, the number of software application performance data sets 202A, 202B, 202C, and 202D may each include incident event data 226A, 226B, 226C, and 226D and software application performance data 228A, 228B, 228C, and 228D.

In particular embodiments, the incident event data 226A, 226B, 226C, and 226D may include, for example, any recorded data (e.g., recorded by one or more software application performance monitoring (APM) systems) or documented data (e.g., data documented by site reliability engineers (SREs) or other members of technical staff (MTS) during a response to an incident event) that may be associated with a software application or software service fault, a software application or software service outage, a software application or software service data breach, a software application or software service downtime, or other similar software application or software service incident event that may occur over the lifespan of a software application, a software service, or a software system.

In another instance, in accordance with the presently disclosed embodiments, the incident event data 226A, 226B, 226C, and 226D may include one or more of a data set of publicly-available incident event data associated with, for example, a protracted outage of a software application (e.g., software application 138) or a data set of proprietary incident event data associated with an outage of a software application (e.g., software application 138). Similarly, in particular embodiments, the software application performance data 228A, 228B, 228C, and 228D may include, for example, software application performance metrics or software application telemetry data 152. For example, in one embodiment, the software application performance metrics may include key performance indicator (KPI) data indicative of the operational performance of a software application (e.g., software application 138).

For example, the KPI data may include one or more of a service uptime metric indicating a proportion of time a software service is operational, a downtime duration metric indicating a length of a particular service outage, a mean time between failures (MTBF) metric indicating the average interval between servicing outages, an average response time metric indicating how quickly a software service responds to user queries, a latency metric indicating a time difference between the beginning of a request and the beginning of a response, a throughput value indicating the volume of requests it can process in a given amount of time, an error rate metric indicating a proportion of unsuccessful requests or user interactions, an incident event count metric indicating the number of number of service issues reported during a certain time period, a mean time to recover (MTTR) metric indicating average amount of time needed to restore a software service after an outage, a utilization rate metric indicating how much of a software service's resources are actually utilized, a scalability metric indicating the software service's capacity to meet rising user demand, or a response and resolution time metric assess how long it takes to recognize and address user queries or problems, or other similar KPI metric indicative of the operational performance of a software application (e.g., software application 138). In another instance, in accordance with the presently disclosed embodiments, the software application performance data 228A, 228B, 228C, and 228D may include one or more of a data set of publicly-available software application performance data associated with, for example, a protracted outage of a software application (e.g., software application 138) or a data set of proprietary software application performance data associated with an outage of a software application (e.g., software application 138).

Similarly, the software application telemetry data 152 may include, for example, performance statistics, error rates, resource utilization, traces, logs, or other sensor-based or APM-based information indicative of the real-time or near real-time behavior of a software application (e.g., software application 138). In particular embodiments, as further depicted by the outage detection and prediction architecture 200, the number of software application performance data sets 202A, 202B, 202C, and 202D may be provided to a data preprocessing system 204. In particular embodiments, the data preprocessing system 204 may include any system suitable for formatting and preprocessing (e.g., preparing) the number of software application performance data sets 202A, 202B, 202C, and 202D to be provided to an artificial-intelligence model 206 for training and execution.

For example, in particular embodiments, the data preprocessing system 204 may format and preprocess the number of software application performance data sets 202A, 202B, 202C, and 202D by performing one or more of a data cleaning to remove outliers (e.g., irrelevant features or variables that would otherwise overfit the artificial-intelligence model 206) within the number of software application performance data sets 202A, 202B, 202C, and 202D, data normalization to scale the number of software application performance data sets 202A, 202B, 202C, and 202D to be consistently formatted throughout the data set, and/or data augmentation to increase diversity within the number of software application performance data sets 202A, 202B, 202C, and 202D by creating modified copies of existing data.

In one instance, in accordance with the presently disclosed embodiments, the data preprocessing system 204 may preprocess the number of software application performance data sets 202A, 202B, 202C, and 202D by normalizing disparate key performance indicator (KPI) data indicative of the operational performance of the software application (e.g., software application 138). For example, in one embodiment, the disparate key KPI data may include one or more of a data set of hardware computing KPI data (e.g., CPU usage KPI data, GPU usage KPI data, memory availability KPI data, disk space availability KPI data, network traffic KPI data, and so forth), a data set of software computing KPI data (e.g., response time KPI data, latency KPI data, throughput KPI data, utilization rate KPI data, and so forth), or a data set of hybrid computing KPI data (e.g., some combination of hardware computing KPI data and software computing KPI data).

In particular embodiments, as further depicted by the outage detection and prediction architecture 200, upon the data preprocessing system 204 preprocessing the number of software application performance data sets 202A, 202B, 202C, and 202D, the artificial-intelligence model 206 may be trained on the preprocessed number of software application performance data sets 202A, 202B, 202C, and 202D to generate a prediction 216 of an impending outage for the software application (e.g., software application 138). For example, in one embodiment, the artificial-intelligence model 206 may include one or more of a language model (LM), a large language model (LLM), a bidirectional and auto-regressive transformer (BART) model, a bidirectional encoder representations for transformer (BERT) model, a generative pretrained transformer (GPT) model, a diffusion model, a foundation model (FM), or other generative artificial-intelligence model 206 (e.g., deep neural networks (DNNs), deep convolutional neural networks (DCNNs)) that may be trained to generate one or more predictions 224 of a potentially protracted outage of the software application (e.g., software application 138).

For example, the artificial-intelligence model 206 (e.g., FM) may include a multimodal foundation model (MMFM) that may be suitable for processing and executing upon multiple data modalities of KPI data (e.g., different types of KPI data, such as service uptime KPI data, downtime duration KPI data, average response time KPI data, latency KPI data, throughput KPI data, mean time to recover (MTTR) KPI data, response and resolution time KPI data, and so forth) that may be indicative of an impending outage (e.g., protracted outage) of the software application (e.g., software application 138). Thus, in accordance with the presently disclosed embodiments, prior to providing the number of software application performance data sets 202A, 202B, 202C, and 202D to the artificial-intelligence model

206 (e.g., FM, MMFM), the data preprocessing system 204 may normalize (e.g., scale) the disparate KPI data included within the number of software application performance data sets 202A, 202B, 202C, and 202D, such that the multiple data modalities of KPI data may be normalized (e.g., scaled) and formatted to be consistent throughout for better and more accurate training of the artificial-intelligence model 206 (e.g., FM, MMFM).

Specifically, in accordance with the presently-disclosed embodiments, the artificial-intelligence model 206 may include a foundation model (FM) that may be pretrained in accordance with a self-supervised learning (SSL) process on unlabeled software application performance data sets 202A, 202B, 202C, and 202D from a number of large-scale and protracted software application outages (e.g., software application outage events affecting more than 500,000 users, more than 1 million users, more than 10 million users, more than 50 million user, more than 100 million users and persisting for more than 30 minutes, more than 1 hour, more than 2 hours, more than 6 hours, more than 12 hours, or more than 24 hours), and thus allowing the artificial-intelligence model 206 (e.g., FM) infer KPI data patterns, recognize relationships between KPI data, discern context of KPI data, and generalize knowledge for accurately predicting such large-scale and protracted outages before the occurrence thereof. In particular embodiments, the artificial-intelligence model 206 (e.g., FM, MMFM) may generate the prediction 216 of an impending outage for the software application (e.g., software application 138) by generating a prediction of one or more KPI values indicative of the impending outage for the software application (e.g., software application 138). For example, in one embodiment, the one or more KPI values may include one or more of a service uptime value, a downtime duration value, a mean time between failures (MTBF) value, an average response time value, a latency value, a throughput value, an error rate value, an incident event count value, a mean time to recover (MTTR) value, a utilization rate value, a scalability value, a response and resolution time value, or other KPI value that may be indicative of a potentially protracted outage of the software application (e.g., software application 138). Specifically, having been trained on various KPI data included within the number of software application performance data sets 202A, 202B, 202C, and 202D associated with previous large-scale and protracted outages, the artificial-intelligence model 206 (e.g., FM, MMFM) may accurately predict an impending outage for the software application (e.g., software application 138) based on whether a KPI value generated by the artificial-intelligence model 206 (e.g., FM, MMFM) corresponds to a KPI value included within the number of software application performance data sets 202A, 202B, 202C, and 202D associated with previous large-scale and protracted outages.

In particular embodiments, upon the artificial-intelligence model 206 being trained (e.g., pretrained) to generate the prediction 216 of an impending outage for the software application (e.g., software application 138), the artificial-intelligence model 206 may be further fine-tuned to generate the prediction 216 of an impending outage for the software application (e.g., software application 138) based on only a data set of hardware computing KPI data (e.g., CPU usage KPI data, GPU usage KPI data, memory availability KPI data, disk space availability KPI data, network traffic KPI data, and so forth), only a data set of software computing KPI data (e.g., response time KPI data, latency KPI data, throughput KPI data, utilization rate KPI data, and so forth), or only a data set of hybrid computing KPI data (e.g., some combination of hardware computing KPI data and software computing KPI data).

In particular embodiments, based on the preprocessed software application performance data, and, in response to the training of the artificial-intelligence model 206 (e.g., FM, MMFM), the artificial-intelligence model 206 (e.g., FM, MMFM) may be fine-tuned to generate a prediction 216 of an impending outage (e.g., protracted outage) of the software application (e.g., software application 138) based on only a data set of hardware computing KPI data, based on only a data set of software computing KPI data, or based on only a data set of hybrid computing KPI data.

Specifically, in accordance with the presently disclosed embodiments, subsequent to the pretraining of the artificial-intelligence model 206 (e.g., FM, MMFM), the artificial-intelligence model 206 (e.g., FM, MMFM) may be adapted (e.g., hardware model adaptation 208, software model adaptation 210, hybrid model adaptation 212, real-time model adaptation 214) by fine-tuning the one or more the artificial-intelligence model 206 (e.g., FM, MMFM) on a smaller, domain-specific or task-specific data set (e.g., a data set of hardware computing KPI data, a data set of software computing KPI data, a data set of hybrid computing KPI data) including labeled examples, such that the artificial-intelligence model 206 (e.g., FM, MMFM) may generate accurate predictions 216 of an impending outage (e.g., protracted outage) of a software application (e.g., software application 138) even when an input data set (e.g., number of software application performance data sets 202A, 202B, 202C, 202D) includes a single modality of KPI data (e.g., average response time) or is otherwise heavily biased toward a particular modality of KPI data (e.g., average response time as opposed to utilization rate or service uptime).

For example, as further depicted by in particular embodiments, upon the artificial-intelligence model 206 being trained (e.g., pretrained) to generate the prediction 216 of an impending outage for the software application (e.g., software application 138), the artificial-intelligence model 206 may be fine-tuned to a hardware model adaptation 208, a software model adaptation 210, a hybrid model adaptation 212, or real-time model adaptation 214 to generate more granular predictions 216 covering a large range of potential KPI data indicative of an impending outage for the software application (e.g., software application 138). For example, the KPI data for a particular software application (e.g., software application 138) may be heavily biased toward response time while the KPI data for another software application (e.g., software application 138) may be heavily biased toward utilization rate.

Similarly, response time alone may vary widely across different components of the software application (e.g., software application 138), such that for some components of the software application (e.g., software application 138) response time may be measured in microseconds (μs) while for other components of the software application (e.g., software application 138) may be measured in milliseconds (ms). Generating a prediction 216 utilizing only the pretrained artificial-intelligence model 206 may produce erroneous or biased results. Thus, in accordance with the presently disclosed embodiments, the software model adaptation 210 of the pretrained artificial-intelligence model 206, for example, may be fine-tuned on large range of scales and units of software computing KPI data (e.g., a large range of response time KPI scales and units measured in microseconds (μs), milliseconds (ms), and seconds, a large range latency KPI scales and units measured in microseconds (μs), milliseconds (ms), and seconds, a large range of throughput KPI scales and units measured in bits per second, megabits per second (mbps), a large range utilization rate KPI scales and units measured in percentages, fractions, float values, and so forth). In this way, the software model adaptation 210 of the pretrained artificial-intelligence model 206 may generate an accurate prediction 216 of an impending outage for the software application (e.g., software application 138) even when the number of software application performance data sets 202A, 202B, 202C, and 202D is heavily biased toward a specific KPI data (e.g., average response time vs. utilization rate).

In particular embodiments, upon the artificial-intelligence model 206 generating the prediction 216 of an impending outage for the software application (e.g., software application 138), the outage detection and prediction architecture 200 may then transmit the prediction 216 of an impending outage for the software application (e.g., software application 138) to a computing device (e.g., user computing device 104) to display a visual report of the prediction 216 of an impending outage for the software application (e.g., software application 138). For example, in one embodiment, the computing device (e.g., user computing device 104) may display a software application monitoring dashboard, which may include a visual representation of the prediction 216 of an impending outage for the software application (e.g., software application 138), such as a graph, a heat map, or other visual representation of one or more predicted KPI values indicative of an impending outage for the software application (e.g., software application 138).

For example, in one embodiment, the computing device (e.g., user computing device 104) may display a software application monitoring dashboard, which may include the visual representation of the prediction 216 of the impending outage for the software application (e.g., software application 138) to be viewed and interacted with by a user (e.g., user 102). In particular embodiments, in response to the user (e.g., user 102) providing one or more user inputs to the software application monitoring dashboard executing on the computing device (e.g., user computing device 104), a remediation (e.g., patching) of the software application (e.g., software application 138) may be executed prior to the potential occurrence of a protracted outage of the software application (e.g., software application 138) to preempt any occurrence of a protracted outage of the software application (e.g., software application 138).

Thus, by predicting potentially protracted outages of software applications, services, and systems before the protracted outages are allowed to occur may mitigate the potential for software application faults, software service outages, data breaches, or other systemic vulnerabilities that may occur in software applications, systems, and services over the lifespan of the software applications, services, and systems, and thereby preempt the occurrences of protracted outages and permanent disruptions to services. Additionally, by generating predictions of a potentially protracted outage before a protracted outage occur or and persist, the present embodiments may further extend the lifespan, serviceability, and maintainability of software applications, services, and systems.

Furthermore, by pretraining and fine-tuning the artificial-intelligence model 206 (e.g., FM, MMFM) to predict potentially protracted outages of software applications, services, and systems before the protracted outages are allowed to occur, the present embodiments may further reduce the processing workloads of the one or more processor(s) 112 and the storage capacity of the memory 116. In particular, the present embodiments may reduce the processing workloads of the one or more processor(s) 112 and the storage capacity of the memory 116 because while the initial pretraining of the artificial-intelligence model 206 (e.g., FM, MMFM) may be compute-intensive and computationally expensive (e.g., requiring the compute power of dozens or hundreds of artificial-intelligence (AI) accelerators and terabytes (TBs) of memory capacity), the fine-tuning of the artificial-intelligence model 206 (e.g., FM, MMFM) to predict potentially protracted outages of software applications, services, and systems based on only a data set of hardware computing KPI data, based on only a data set of software computing KPI data, based on only a data set of hybrid computing KPI data may be accomplished utilizing only a single AI accelerator (e.g., one or more processor(s) 112) and only a few gigabytes (GBs) of memory 116 capacity. In this way, the present embodiments may further reduce the processing workloads of the one or more processor(s) 112 and the storage capacity of the memory 116 in accordance with the techniques described herein.

FIG. 3 illustrates a flowchart of an example method 300 for generating predictions of protracted outages of software applications and computing systems, in accordance with one or more embodiments of the present disclosure. The method 300 may be performed utilizing the one or more processor(s) 112 of cloud computing system 106 as described above with respect to FIG. 1. The method 300 may begin at block 302 with the processor(s) 112 accessing software application performance data (e.g., the number of software application performance data sets 202A, 202B, 202C, and 202D). For example, in particular embodiments, the accessed software application performance data (e.g., the number of software application performance data sets 202A, 202B, 202C, and 202D) may be associated with an operational performance of a software application (e.g., software application 138).

The method 300 may continue at block 304 with the processor(s) 112 preprocessing the software application performance data, in which preprocessing the software application performance data includes normalizing disparate key performance indicator (KPI) data indicative of the operational performance of the software application. The method 300 may then continue at decision 306 with the processor(s) 112 confirming whether the software application performance data (e.g., the number of software application performance data sets 202A, 202B, 202C, and 202D) has been preprocessed. In one embodiment, in response to confirming that the software application performance data (e.g., the number of software application performance data sets 202A, 202B, 202C, and 202D) has not been preprocessed (e.g., at decision 306), the method 300 may return to block 304 as discussed above.

On the other hand, in response to confirming that the software application performance data (e.g., the number of software application performance data sets 202A, 202B, 202C, and 202D) has been preprocessed (e.g., at decision 306), the method 300 may then continue at block 308 with the processor(s) 112 executing, based at least in part on the preprocessed software application performance data, and, in response to a training of the artificial-intelligence model (e.g., artificial-intelligence model 206), the artificial-intelligence model (e.g., artificial-intelligence model 206) to generate a prediction (e.g., prediction 216) of an impending outage for the software application (e.g., software application 138). For example, in one embodiment, the generated prediction (e.g., prediction 216) of the impending outage may include a prediction of a potentially protracted outage of the software application (e.g., software application 138).

The method 300 may then continue at decision 310 with the processor(s) 112 confirming whether the prediction (e.g., prediction 216) of an impending outage for the software application (e.g., software application 138) has been generated. In one embodiment, in response to confirming that the prediction (e.g., prediction 216) of an impending outage for the software application (e.g., software application 138) has not been generated (e.g., at decision 310), the method 300 may return to block 308 as discussed above. On the other hand, in response to confirming that the prediction (e.g., prediction 216) of an impending outage for the software application (e.g., software application 138) has been generated (e.g., at decision 310), the method 300 may then continue at block 312 with the processor(s) 112 outputting, by the artificial-intelligence model (e.g., artificial-intelligence model 206), the prediction (e.g., prediction 216) of the impending outage for the software application (e.g., software application 138).

The method 300 may then continue at block 314 with the processor(s) 112 causing a computing device (e.g., user computing device 104) to display a visual representation of the outputted prediction (e.g., prediction 216) of the impending outage for the software application (e.g., software application 138). For example, in one embodiment, the processor(s) 112 may cause the computing device (e.g., user computing device 104) to display a software application monitoring dashboard, which may include the visual representation (e.g., a graph, a heat map, or other visual representation) of the prediction (e.g., prediction 216) of an impending outage for the software application (e.g., software application 138).

The method 300 may then conclude at block 316 with the processor(s) 112, in response to one or more user inputs to the displayed software application monitoring dashboard executing on the computing device (e.g., user computing device 104), causing a remediation (e.g., patching) of the software application (e.g., software application 138) to be executed prior to the potential occurrence of a protracted outage of the software application (e.g., software application 138) to preempt any occurrence of a protracted outage of the software application (e.g., software application 138).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory configured to store a software application and software application performance data, wherein the software application performance data is associated with an operational performance of the software application; and
a processor operably coupled to the memory and configured to:
access the software application performance data;
preprocess the software application performance data, wherein preprocessing the software application performance data comprises normalizing disparate key performance indicator (KPI) data indicative of the operational performance of the software application;
train an artificial-intelligence algorithm based at least in part on a training data set of publicly-available software application performance data associated with at least a first protracted outage of a software application and a training data set of proprietary software application performance data associated with at least a second protracted outage of a software application;
execute, based at least in part on the preprocessed software application performance data, and, in response to the training of the artificial-intelligence algorithm, an artificial-intelligence model to generate a prediction of an impending outage for the software application, wherein the prediction of the impending outage comprises a prediction of a potentially protracted outage of the software application;
output, by the artificial-intelligence model, the prediction of the impending outage for the software application;
cause a computing device to display a visual representation of the outputted prediction of the impending outage for the software application; and
in response to receiving one or more user inputs, cause a remediation of the software application to be executed to preempt the potentially protracted outage of the software application.

2. The system of claim 1, wherein the software application performance data comprises software application performance metrics or software application telemetry data.

3. The system of claim 1, wherein the disparate key KPI data comprises one or more of a data set of hardware computing KPI data, a data set of software computing KPI data, or a data set of hybrid computing KPI data.

4. The system of claim 1, wherein the artificial-intelligence model comprises a pretrained foundation model (FM) trained and executed to generate a prediction of one or more KPI values indicative of the impending outage for the software application, and wherein the pretrained FM comprises one or more of a language model (LM), a large language model (LLM), a bidirectional and auto-regressive transformer (BART) model, a bidirectional encoder representations for transformer (BERT) model, a generative pre-trained transformer (GPT) model, or a diffusion model.

5. The system of claim 1, wherein the artificial-intelligence model comprises a foundation model (FM) fine-tuned to generate the prediction of the impending outage for the software application based at least in part on:
only a data set of hardware computing KPI data;
only a data set of software computing KPI data;

only a data set of hybrid computing KPI data; or
only a data set of real-time computing KPI data.

6. The system of claim 1, wherein the processor is further configured to output the prediction of the impending outage for the software application by outputting, by the artificial-intelligence model, a prediction of one or more KPI values indicative of the impending outage for the software application, and wherein the one or more KPI values comprises one or more of a service uptime value, a downtime duration value, a mean time between failures (MTBF) value, an average response time value, a latency value, a throughput value, an error rate value, an incident event count value, a mean time to recover (MTTR) value, a utilization rate value, a scalability value, or a response and resolution time value.

7. The system of claim 1, wherein the processor is further configured to:
cause the computing device to display a software application monitoring dashboard including the visual representation of the outputted prediction of the impending outage for the software application; and
in response to receiving the one or more user inputs, provide to the computing device a set of instructions for patching the software application to preempt the potentially protracted outage of the software application.

8. A method, comprising:
accessing software application performance data, wherein the software application performance data is associated with an operational performance of a software application;
preprocessing the software application performance data, wherein preprocessing the software application performance data comprises normalizing disparate key performance indicator (KPI) data indicative of the operational performance of the software application;
training an artificial-intelligence algorithm based at least in part on a training data set of publicly-available software application performance data associated with at least a first protracted outage of a software application and a training data set of proprietary software application performance data associated with at least a second protracted outage of a software application;
executing, based at least in part on the preprocessed software application performance data, and, in response to the training of the artificial-intelligence algorithm, an artificial-intelligence model to generate a prediction of an impending outage for the software application, wherein the prediction of the impending outage comprises a prediction of a potentially protracted outage of the software application;
outputting, by the artificial-intelligence model, the prediction of the impending outage for the software application; and
causing a computing device to display a visual representation of the outputted prediction of the impending outage for the software application; and
in response to receiving one or more user inputs, causing a remediation of the software application to be executed to preempt the potentially protracted outage of the software application.

9. The method of claim 8, wherein the software application performance data comprises software application performance metrics or software application telemetry data.

10. The method of claim 8, wherein the disparate key KPI data comprises one or more of a data set of hardware computing KPI data, a data set of software computing KPI data, or a data set of hybrid computing KPI data.

11. The method of claim 8, wherein the artificial-intelligence model comprises a pretrained foundation model (FM) trained and executed to generate a prediction of one or more KPI values indicative of the impending outage for the software application, and wherein the pretrained FM comprises one or more of a language model (LM), a large language model (LLM), a bidirectional and auto-regressive transformer (BART) model, a bidirectional encoder representations for transformer (BERT) model, a generative pretrained transformer (GPT) model, or a diffusion model.

12. The method of claim 8, wherein the artificial-intelligence model comprises a foundation model (FM) fine-tuned to generate the prediction of the impending outage for the software application based at least in part on:
    only a data set of hardware computing KPI data;
    only a data set of software computing KPI data;
    only a data set of hybrid computing KPI data; or
    only a data set of real-time computing KPI data.

13. The method of claim 8, further comprising outputting the prediction of the impending outage for the software application by outputting, by the artificial-intelligence model, a prediction of one or more KPI values indicative of the impending outage for the software application, and wherein the one or more KPI values comprises one or more of a service uptime value, a downtime duration value, a mean time between failures (MTBF) value, an average response time value, a latency value, a throughput value, an error rate value, an incident event count value, a mean time to recover (MTTR) value, a utilization rate value, a scalability value, or a response and resolution time value.

14. The method of claim 8, further comprising:
    causing the computing device to display a software application monitoring dashboard including the visual representation of the outputted prediction of the impending outage for the software application; and
    in response to receiving the one or more user inputs, provide to the computing device a set of instructions for patching the software application to preempt the potentially protracted outage of the software application.

15. A non-transitory computer-readable medium storing instructions that, when executed by one or more processors, cause the one or more processors to:
    access software application performance data, wherein the software application performance data is associated with an operational performance of a software application;
    preprocess the software application performance data, wherein preprocessing the software application performance data comprises normalizing a disparate key performance indicator (KPI) data indicative of the operational performance of the software application;
    train an artificial-intelligence algorithm based at least in part on a training data set of publicly-available software application performance data associated with at least a first protracted outage of a software application and a training data set of proprietary software application performance data associated with at least a second protracted outage of a software application;
    execute, based at least in part on the preprocessed software application performance data, and, in response to the training of the artificial-intelligence algorithm, an artificial-intelligence model to generate a prediction of an impending outage for the software application, wherein the prediction of the impending outage comprises a prediction of a potentially protracted outage of the software application;
    output, by the artificial-intelligence model, the prediction of the impending outage for the software application;
    cause a computing device to display a visual representation of the outputted prediction of the impending outage for the software application; and
    in response to receiving one or more user inputs, cause a remediation of the software application to be executed to preempt the potentially protracted outage of the software application.

16. The non-transitory computer-readable medium of claim 15, wherein the software application performance data comprises software application performance metrics or software application telemetry data.

17. The non-transitory computer-readable medium of claim 15, wherein the disparate key KPI data comprises one or more of a data set of hardware computing KPI data, a data set of software computing KPI data, or a data set of hybrid computing KPI data.

18. The non-transitory computer-readable medium of claim 15, wherein the artificial-intelligence model comprises a pretrained foundation model (FM) trained and executed to generate a prediction of one or more KPI values indicative of the impending outage for the software application, and wherein the pretrained FM comprises one or more of a language model (LM), a large language model (LLM), a bidirectional and auto-regressive transformer (BART) model, a bidirectional encoder representations for transformer (BERT) model, a generative pretrained transformer (GPT) model, or a diffusion model.

19. The non-transitory computer-readable medium of claim 15, wherein the artificial-intelligence model comprises a foundation model (FM) fine-tuned to generate the prediction of the impending outage for the software application based at least in part on:
    only a data set of hardware computing KPI data;
    only a data set of software computing KPI data;
    only a data set of hybrid computing KPI data; or
    only a data set of real-time computing KPI data.

20. The non-transitory computer-readable medium of claim 15, wherein the instructions further cause the one or more processors to output the prediction of the impending outage for the software application by outputting, by the artificial-intelligence model, a prediction of one or more KPI values indicative of the impending outage for the software application, and wherein the one or more KPI values comprises one or more of a service uptime value, a downtime duration value, a mean time between failures (MTBF) value, an average response time value, a latency value, a throughput value, an error rate value, an incident event count value, a mean time to recover (MTTR) value, a utilization rate value, a scalability value, or a response and resolution time value.

* * * * *